United States Patent [19]
Fraser

[11] Patent Number: 5,943,319
[45] Date of Patent: *Aug. 24, 1999

[54] PACKET FORMAT INTERFACE FOR TELECOMMUNICATION INSTRUMENTS

[75] Inventor: Alexander Gibson Fraser, Bernardsville, N.J.

[73] Assignee: Lucent Technologies Inc., Murray Hill, N.J.

[*] Notice: This patent is subject to a terminal disclaimer.

[21] Appl. No.: 08/627,658

[22] Filed: Apr. 4, 1996

[51] Int. Cl.⁶ .................................................. H04L 12/16
[52] U.S. Cl. .................... 370/259; 370/242; 370/286; 370/395; 370/419; 370/463; 370/466; 370/474; 370/476; 370/477; 370/525; 370/526; 379/410; 704/215
[58] Field of Search .................................. 370/241–245, 370/259, 271, 282, 285, 286, 359, 389, 395, 410, 419, 420, 421, 474, 401, 402, 477, 493, 496, 522, 911, 463; 704/211, 212, 215; 379/406, 410

[56] References Cited

U.S. PATENT DOCUMENTS

| | | | |
|---|---|---|---|
| 4,775,997 | 10/1988 | West, Jr. et al. | 379/58 |
| 4,787,082 | 11/1988 | Delaney et al. | 370/85 |
| 5,136,584 | 8/1992 | Hedlund | 370/94.1 |
| 5,309,432 | 5/1994 | Kanakia | 370/60 |
| 5,343,462 | 8/1994 | Sekihata et al. | 370/244 |
| 5,347,304 | 9/1994 | Moura et al. | 348/12 |
| 5,406,583 | 4/1995 | Dagdeviren | 375/5 |
| 5,459,722 | 10/1995 | Sherif | 370/395 |
| 5,485,370 | 1/1996 | Moss et al. | 379/93.17 |
| 5,533,017 | 7/1996 | Thor | 70/419 |
| 5,535,204 | 7/1996 | Li | 370/495 |
| 5,623,491 | 4/1997 | Skoog | 370/477 |
| 5,668,955 | 9/1997 | DeCiutiis et al. | 379/130 |
| 5,719,870 | 2/1998 | Baker et al. | 370/463 |
| 5,734,710 | 3/1998 | Hirth et al. | 379/229 |

OTHER PUBLICATIONS

AT&T Corp., AT&T ExpressRoute Digital Adapter 1000/2000, Release 6.0, Technical Reference, Issue 3, Mar. 1995, pp. 1–1 through 1–3; 1–9; 2–1 through 2–3; 2 unnumbered pages. Technological background of the invention.

D. R. Coffield et al., "The Leading Edge in High–Speed Data Communications Services: The InterSpan(R) Asynchronous Transfer Mode Service," AT&T Technical Journal, Jul./Aug. 1995, pp. 38–49. Technological background of the invention.

G.–H. Im et al., "51.84 Mb/s 16–CAP ATM LAN Standard," IEEE Jounral on Selected Areas in Communications, vol. 13, No. 4, May 1995, pp. 620–632. Cited in specification.

*Primary Examiner*—Dang Ton
*Assistant Examiner*—Seema S. Rao

[57] ABSTRACT

Improved telecommunication apparatus is realized with a structure that is tailored to interact with the telecommunication network strictly in packet format. The apparatus includes circuitry for creating either control or information packets, where each packet comprises a header portion and a payload portion. The apparatus also includes an identifier module that enables the apparatus to identify itself to the telecommunication network with an identifier signal that is unique to it. The apparatus further includes encoding and decoding circuitry to create, and decode, highly compressed digital representations of audio signals and, optionally, encryption and decryption features to enhance security of communication. Still further, the apparatus includes circuitry to enable users to interact with the network and partake of telephony service.

27 Claims, 8 Drawing Sheets

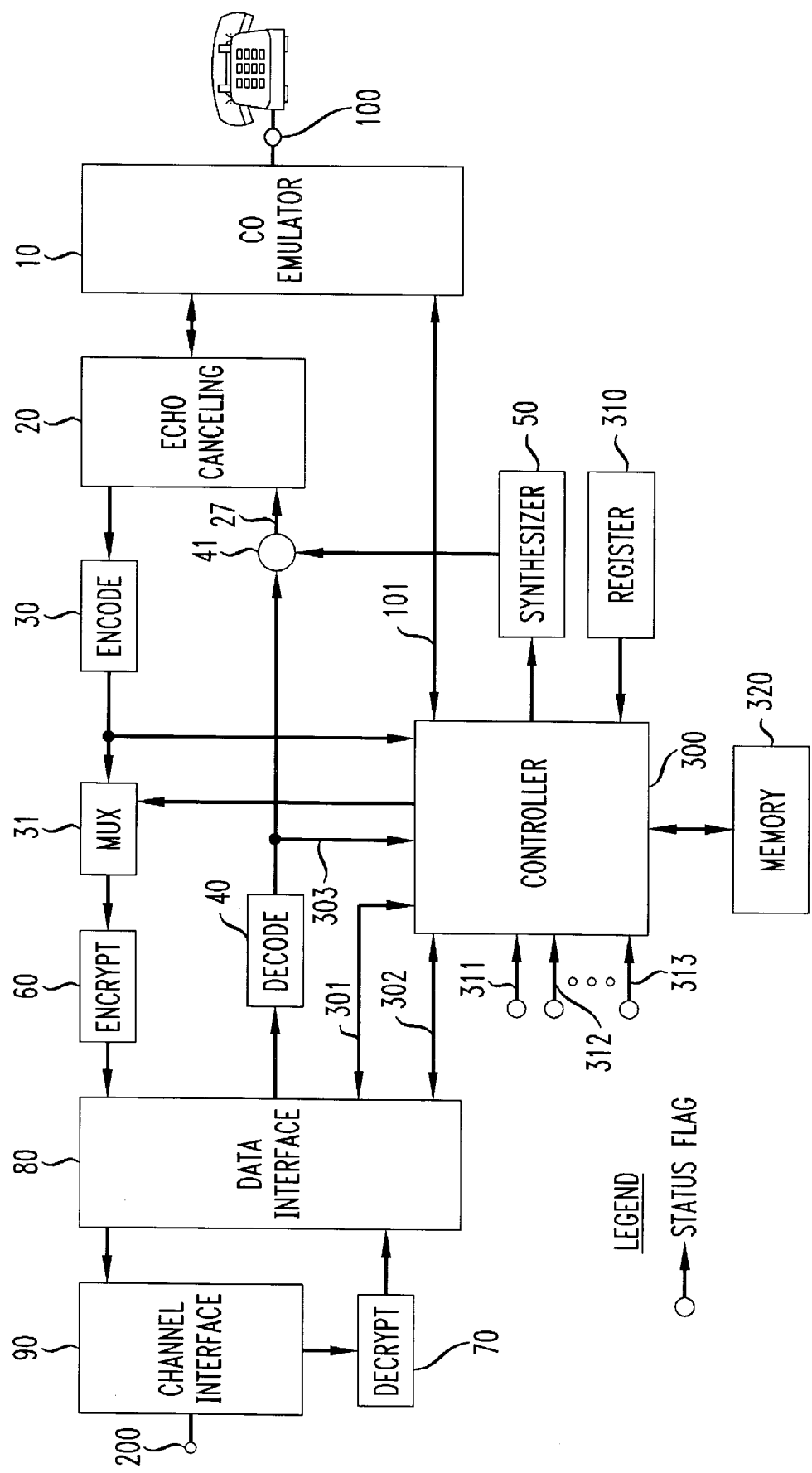

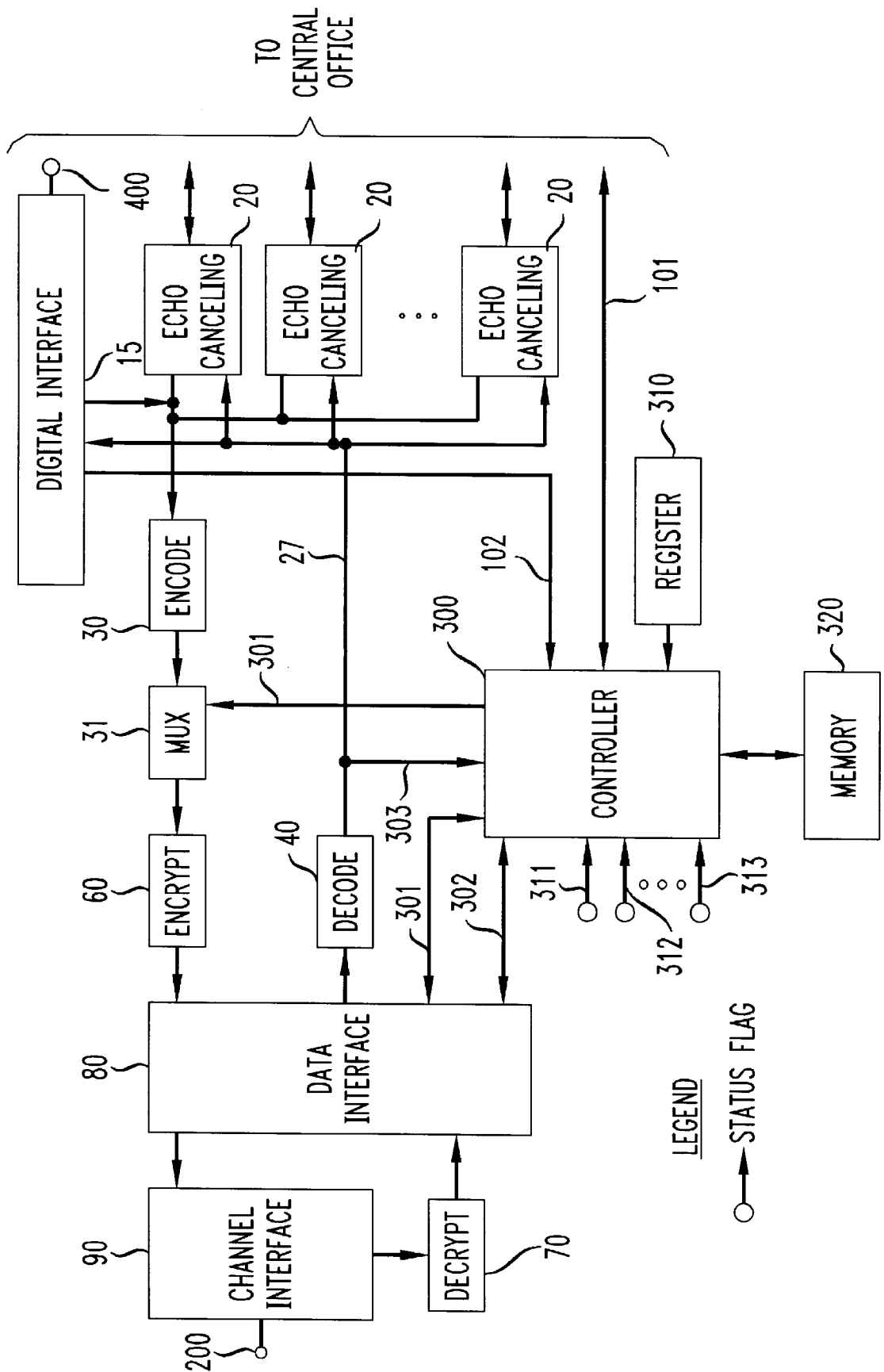

PACKET FORMAT INTERFACE FOR TELECOMMUNICATION INSTRUMENTS

CROSS REFERENCE TO RELATED APPLICATIONS

Related subject matter is disclosed in the following applications filed concurrently herewith and assigned to the same Assignee thereof: U.S. patent application Ser. No. 08/627,661, now pending, entitled "A Customer Telecommunication Interface Device Having A Unique Identifier;" U.S. patent application Ser. No. 08/627,659, now pending, entitled "Packet Telephone System;" U.S. patent application Ser. No. 08/627,660, now U.S. Pat. No. 5,835,580, entitled "Method And Apparatus For Automated Provisioning And Billing Of Communication Services;" and U.S. patent application Ser. No. 08/627,657, now pending, entitled "A Customer Telecommunication Interface Device With Built-In Network Features."

BACKGROUND OF THE INVENTION

This relates to telecommunications, and, in particular, to telephones and interface devices that are interposed between a telephone and a telecommunications network.

Present day telecommunication networks comprise switches that offer a substantial amount of control over the network to provide connectivity and customer features, such as "call waiting", "caller ID", etc. The customers are connected to the network at its extremities, most often through analog lines brought to the homes and offices and connected to simple telephone instruments. The interaction of customers with the network is generally limited still to signaling with the telephone instrument's switch hook and with the dial pad.

It is believed that substantial benefits will accrue to the overall network and to users by imparting more sophisticated network interaction capabilities to the equipment at the extremities of the network.

SUMMARY

Improved telecommunication apparatus is realized with a structure that is tailored to interact with the telecommunication network strictly in packet format. The apparatus includes circuitry for creating either control or information packets, where each packet comprises a header portion and a payload portion. The apparatus also includes an identifier module that enables the apparatus to identify itself to the telecommunication network with an identifier signal that is unique to it. The apparatus further includes encoding and decoding circuitry to create, and decode, highly compressed digital representations of audio signals, and optionally, encryption and decryption means to enhance security of communication. Still further, the apparatus includes circuitry to enable users to interact with the network and partake of telephony service.

BRIEF DESCRIPTION OF THE DRAWING

FIG. 8 presents an embodiment where messages are stored in a digital memory associated with the apparatus controller; and FIG. 9 presents an embodiment that is suitable for interaction with a circuit-switched central office.

DETAILED DESCRIPTION

Figure 1:
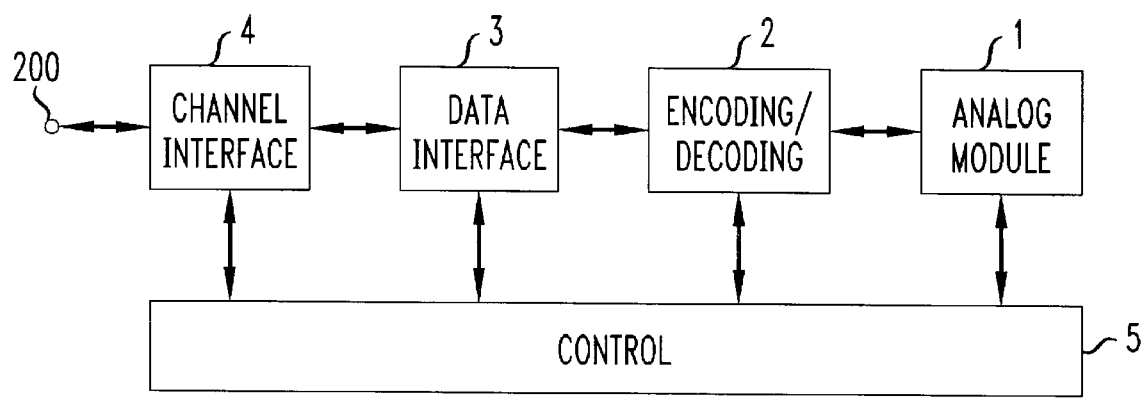
FIG. 1 presents a block diagram of apparatus that interacts with a telecommunication network in packet format.

One of the most effective means for providing customers with increased control over their telecommunication capabilities is to employ a communication protocol that offers a capable mechanism for communicating control information between the customer and the network. A digital communication approach, such as ISDN, is one such effective mechanism.

In a co-pending application entitled "Packet Telephone System", filed on even date hereof, bearing the Ser. No. 08/627,659, now pending, and assigned to the assignee of this application, which application is hereby incorporated by reference, a packet telephone system is disclosed where a portion, or perhaps even the entire, telecommunication network (both voice and data) consists of a packet switching based network with network interface units at the extremes of the network. Such a network provides all telecommunication services, including plain telephony service (POTS).

The problem with using packet switching systems for plain telephony is that various delays are inherent in such systems, and those delays make it very difficult to have an effective, global, system for voice communication.

One of the most demanding requirements of voice communication is round trip delay. It has been found experimentally that a conversation becomes strained, unpleasant and disconcerting when a signal's round trip delay is greater than 300 msec (the number varies with people and circumstances). It is the round trip delay that is important, rather than just the one-way, because conversations typically comprise questions and statements that call for a response. When a response arrives late, the conversation is perceived to be unsatisfactory.

The round trip delay of a signal is controlled by a number of factors. First, of course, is the distance between the parties. For example, a conversation roughly half-way around the globe and back (40,000 km) will have a round trip delay of approximately 200 msec. That leaves only 100 msec for the other factors that introduce delay (if one is to not exceed 300 msec). Those are coding the speech, decoding the speech, coding the response, decoding the response, and the necessary routing of signals. For a coast-to-coast conversation within the contiguous United States, the round trip delay is approximately 60 msec, and that leaves about 240 msec for those other delays.

When the signal transmission is in the form of packets, the encoding delay must include the time necessary to wait for a snippet of the speech signal to accumulate in order for it to be encoded into a packet, and the decoding time must include the time necessary to ascertain that a complete, error-free, packet has arrived. When speech is sampled at 8,000 samples per second, a byte of speech signal is generated every 125 $\mu$sec. With 4:1 speech compression, that translates to one byte per 0.5 msec, and with 8:1 speech compression, that translates to one byte per 1 msec.

If packets are generated from a plurality of bytes then, of course, there is a delay associated with the assembling of the packet; and the longer the packet, the longer the assembly delay. Moreover, there is a delay that is associated with the placements of the assembled packets onto a time multiplexed channel, and that, on the average, is half the length of a packet.

Routing of packet signals also incurs delays in the traversal through switches. First, because present-day packet switches wait till the entire packet has arrived at a switching node before it is routed toward its destination. Second, in some circumstances two packets may collide (in seeking to use the same transmission resource), and one of the packets must then be delayed. Assuming that a packet is not held up (on the average), that the routing delays are small, and that the decoding delays are small, it still remains that there is a 1 packet's worth delay in assembling the packet, ½ packet's worth of delay in casting the packet onto the channel, and 1 packet's worth of delay in receiving and disassembling the packet. It follows, therefore, that packets for a global call should be less than 40 bytes for 8:1 compression, and 80 bytes for 4:1 compression. Correspondingly, for transcontinental (U.S.) calls, packets should be less than 96 bytes for 8:1 compression, and 192 bytes for 4:1 compression.

From the above it is apparent that carrying natural (duplex) conversations is difficult with a packet switching network, and that large packets—such as used in the Internet—cannot work satisfactorily. Accordingly, it is considered that a telecommunication system which employs packets for voice telephony and which can handle international calls, or certainly transcontinental calls, reasonably well should employ packets with no more than 140 bytes (including the header and the information portions).

Fortuitously, a packet switching protocol is already available that employs short packets. Specifically, the ATM (Asynchronous Transfer Mode) protocol employs packets with 5 byte headers and 48 byte payloads. Use of the ATM protocol allows time to compress speech signals, time to assemble packets, time to encode and decode, time to route packets, and time for the actual transmission. Thus, using the 53 packet ATM format and 8:1 compression, for example, a conversation half-way around the world will have a round trip delay somewhat greater than 300 msec, but it will probably be acceptable to most users. More demanding users can attain a shorter overall delay by reducing the speech compression to 4:1 (and perhaps pay a premium for the improved quality).

As an aside, with a packet size that is in the neighborhood of 50 bytes, the Internet protocol results in a very inefficient utilization of the transmission medium because the addressing scheme used by Internet currently employs a 20 byte header (and there is an effort to increase the header to 40 bytes). A 50 byte packet, or cell, with a 40 byte header uses at most 20% of the network's capacity to communicate user information, and that certainly is inefficient.

Given a global digital network that is ATM-based, where the customer-premises instrument interacts with the network through digital packets, many desired features are within reach. Control packets can be sent by any customer instrument to any other customer instrument, whether that other customer instrument is in an active conversation or not, and the two instruments can interact with each other to realize various features and controls. That other customer instrument can, in fact, be a resource instrument, such as a database. One of the "customer instruments" may, for example, be the administrator of the entire network; and through control packets that are sent to any other component in the entire network, including all other customer instruments, the administrator can obtain information about the status of the network and all of its components.

To summarize the above, the contemplated network as disclosed in the aforementioned and incorporated application offers boundless control capabilities to voice communication customers by providing a packet-switching network that employs short packets, and by offering the packet interface directly to the network interface unit. The following disclosure addresses the network interface unit.

FIG. 1 presents one illustrative embodiment of apparatus that is adapted to co-act directly with the contemplated telecommunication network. It is a customer-premises piece of equipment. Element 1 in FIG. 1 is an analog interface module. The term "analog interface module" includes modules that output sound in response to electrical signals and convert received sound to electrical signals, as well as modules that merely provide an analog interface to the customer. For example, the analog module may include the telephone's circuitry (handset, dial pad, etc.). It may also be merely the conventional telephone jack into which a conventional telephone or the like is plugged. I call such a port a POTS interface.

Analog interface module 1 is coupled to encoding/decoding module 2 which provides a mapping between the analog signal at the interface between elements 1 and 2, and the digital signal at the interface between elements 2 and 3. The encoding/decoding module encodes the signal that flows from element 1 to element 3, and decodes the signal that flows from element 3 to element 1.

Element 3 is a data interface module. It converts digital signals from element 2 and control signals from element 5 into packets (e.g., ATM packets) and, conversely, it converts packets from element 4 into digital control signals and digital information signals for elements 5 and 3, respectively. Element 4 is a channel interface module. Its function is to provide the necessary translation, or formatting, of the packet information for the particular channel that is coupled to port 200. Lastly, element 5 is the control module, and it communicates with elements 1–4, as described more fully below.

It is important to note that the particular embodiment of elements 1–5 is not at all limited to specific hardware modules that are presently realizable. Whereas the following disclosure presents an illustrative embodiment, it should be kept in mind that any modules, known now or in the future, that achieve the functions described above, when interconnected as depicted in FIG. 1, are within the contemplation of this disclosure. This includes equivalents, such as optical modules rather than the electronic modules described herein, such as including A/D- D/A conversion means in element 1, or alternately in element 2, etc. A number of such embodiments are illustratively disclosed below.

Figure 2:
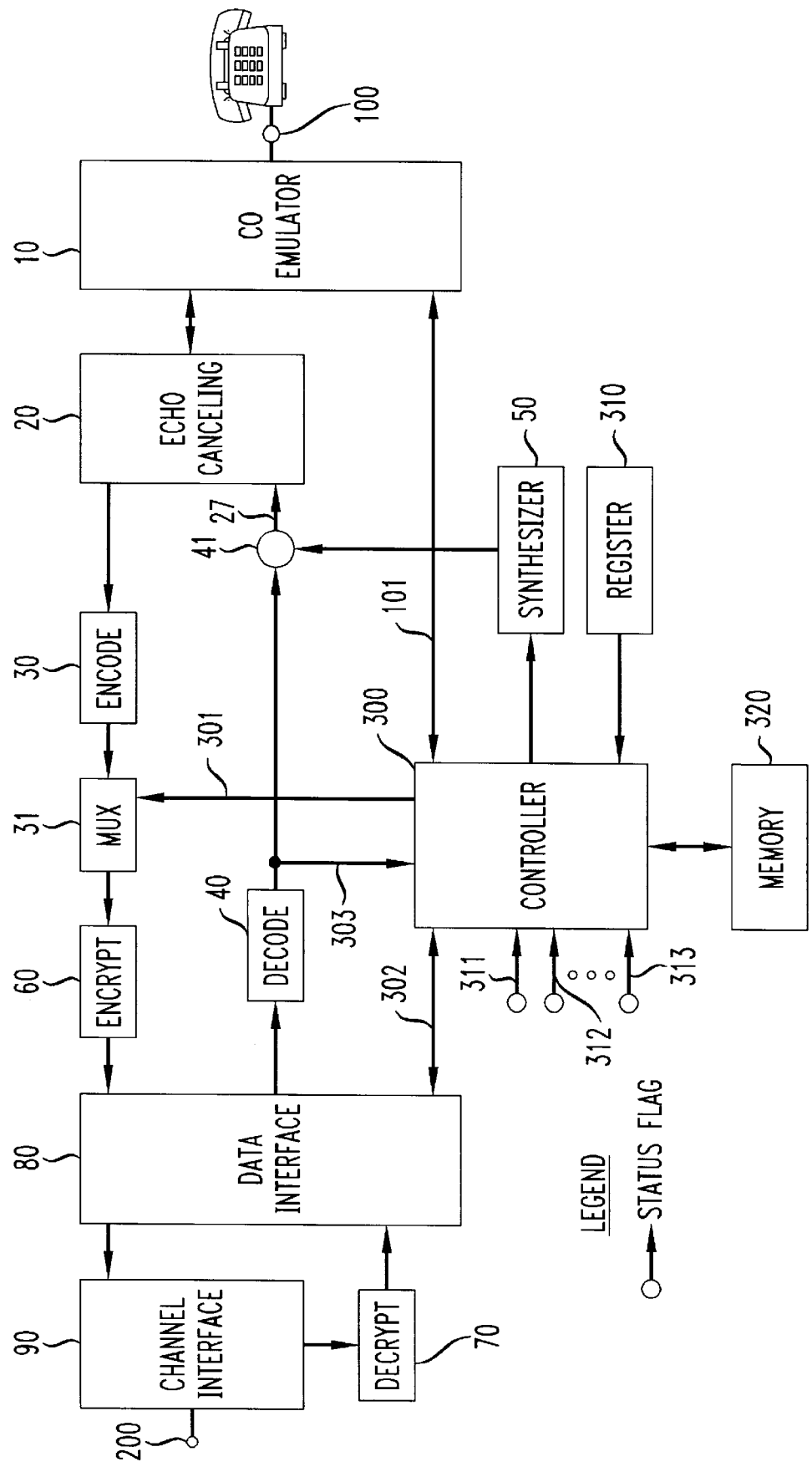
FIG. 2 presents a more detailed block diagram of apparatus that interacts with a telecommunication network in packet format.

Consonant with this spirit, FIG. 2 presents a block diagram of apparatus that effects the functionality of the FIG. 1 diagram (although, for sake of clarity, it omits showing the control exercised by controller 300 over the other elements). In accordance with FIG. 2, a conventional telephone is connected at port 100, and the telecommunication network is coupled to port 200. The information signal at port 100 is analog, and the control signals comprise the switch hook action and either DTMF (dual-tone multi-frequency) signals or rotary dial signals. As suggested above, the circuitry of the telephone connected to port 100 can be incorporated within block 10, leaving port 100 to be the acoustical interface between the FIG. 1 apparatus and the user. For expository purposes, however, it is simpler to assume that a conventional telephone is connected to port 100. It may also be noted that the FIG. 2 apparatus forms a buffer between the telephone instrument and the network. As such, the buffer can be easily used to allow rotary phones to control the network as phones with DTMF signals can do today.

In embodiments where port 100 is adapted to be connected to a conventional telephone, block 10 is a central office emulator circuit. It provides DC power to the telephone, it senses hook switch actions, and it decodes DTMF (or rotary dial's time pulse) signals. The control signals that are applied by the customer's telephone to port 100 and detected by block 10 are applied to controller 300 for its consideration (line 101). Alternatively, the actual detection and interpretation of DTMF signals can be performed by the controller directly (by coupling controller 300 to port 100 directly). One embodiment of a central office emulator circuit is described, for example, in U.S. Pat. No. 4,775,997 issued Oct. 4, 1988.

The voice signals that are applied by customer equipment to port 100 are coupled by emulator 10 to echo canceling circuit 20. Circuit 20 couples this incoming signal to encoder 30, and encoder 30 applies the signal to encryption circuit 60 (via multiplexer 31). The output signal of encryption circuit 60 is coupled to data interface circuit 80, and circuit 80 applies its output signal to channel interface circuit 90. Circuit 90 applies its output signals to port 200 and, thence, to a transmission medium.

Signals arriving at port 200 from the transmission medium are coupled by circuit 90 to decryption circuit 70 and thence to data interface circuit 80. Circuit 70 might be the complement of circuit 60. Information signals developed in circuit 70 are applied to decoder 40, and thence to adder 41. Adder 41 combines the signals of decoder 40 with signals from synthesizer 50 and applies its output signal to echo canceling circuit 20. Following circuit 20, the signal of adder 41 is coupled to emulator 10 and, from there, to port 100. Control signals extracted from arriving packets by circuit 80 are applied to controller 300 via line 301.

When the processing carried out by the elements to the left of element 20 is digital, element 20 must include a A/D converter in the path between element 10 and element 30, and a D/A converter in the path between element 41 and element 10. The signals at port 100 are bi-directional, and so are the signals at the output of emulator 10. This is sometimes called "two-wire transmission". Encoding and decoding, on the other hand, is best done with uni-directional signals, so circuit 20 must include a two-wire to four-wire conversion means. Conversion from two-wire to four-wire format can introduce echo, which corresponds to a leakage of some signal from line 27 into the path that leads to encoder 30. Hence, echo canceling should be provided for. The function of element 20 is to convert from two-wire to four-wire transmission, to carry. out echo canceling as necessary, and to perform the appropriate A/D and D/A conversions. Its construction is perfectly conventional.

As an aside, the echo canceling in element 20 is not quite the same as in modems. In modems, the effort is to eliminate echo in the analog, two-wire, side. Here, the effort is to eliminate echo in the four-wire, digital side. An echo canceler roughly of the type recommended for the FIG. 2 apparatus is disclosed in U.S. Pat. No. 5,406,583, issued Apr. 11,1995.

It is expected that encoder 30 will perform speech compression, in the sense of developing a digital representation of the speech signals that requires fewer bits than the digital representation at the input to encoder 30. Decoder 40 complements encoder 30. More specifically, when a conversation is carried out between two parties and each party employs an associated network interface unit, the decoder 40 of one unit must complement the encoder 30 of the other unit, and vice versa. When the two encoders are the same, then the decoder of a network interface unit is, of course, the complement of the encoder of the same network interface unit.

For purposes of this disclosure, any conventional encoding and decoding apparatus can be used to realize encoder 30 and decoder 40. One example of encoding/decoding apparatus is presented in U.S. patent application Ser. No. 07/782, 686, now abandoned, titled "Generalized Analysis-by-Synthesis Speech Coding Method And Apparatus," filed for W. B. Kleijn on Oct. 25, 1991. The Kleijn application does not show the additional compression that can be achieved when silence detection is included, but such additional compression is described, however, in the ETSI Standard "European Digital Cellular Telecommunications System Fullrate Speech Processing Functions," GSM 6.01, and references GSM 6.31, 6.32, and 6.12, May 1994. When 8:1 compression is desired, it may be necessary to take advantage of silence detection.

Adder 41 provides a means for sending audible signals from controller 300, via synthesizer 50, to port 100; and multiplexer 31 provides a mechanism for sending audible signals from controller 300 to the port 200.

Encrypter 60 and decrypter 70 are optional privacy means. The need for encryption is related, of course, to the desire to keep the communications from being compromised and to the level of risk that the communications channel is insecure. The latter is highly dependent on the nature of transmission channel created in the transmission medium connected to port 200. When that channel is dedicated, in the sense that other users that are connected to the transmission medium are not privy to the conversation (i.e., cannot tune their equipment to gain access to the packets appearing at port 200), then encryption is not as necessary. If, on the other hand, when packets sent to port 200 can be captured by any equipment that is coupled to the transmission medium to which port 200 is, then of course encryption is much more desirable because the situation opens the opportunity to fraud, in addition to the compromising of privacy.

Elements 60 and 70 can be very sophisticated, or quite simple. Many encryption techniques are known in the art, and any one of them can be employed, as agreed to by the designers of the FIG. 1 apparatus and the designers of the network. By way of example, the well-known public key encryption approach may be used, where the unit sends to the network its public key that corresponds to a private key which is embedded or installed in element 60, and receives from the network a public key that the network assigns to the particular network interface unit. In public key systems, the party holding the public key can decypher messages from a sender that employs the corresponding private key, but cannot create messages that would be decyphered by that public key. Also, the party holding the public key can encode a message to the party holding the private key, but no other party can read that message.

The above describes the encryption approach to be agreed to between the FIG. 1 apparatus and the network. That assumes, of course, that the network decyphers the information. Another viable approach is for the network to be completely oblivious to the messages, and the encryption approach being agreed to between the network interface units on the two ends of a call.

In any event, since the specific approach that may be used is not within the scope of this invention, it is not described any further herein. It is expected, however, that in applications where encryption is not perceived to be absolutely necessary but elements 60 and 70 are physically included in the system, those elements will be activated or deactivated under direction of controller 300, either in response to control signals arriving from port 100, or control signals arriving from port 200. When deactivated, those elements are "transparent".

Synthesizer 50 provides a means for creating audible signals to be applied to port 100. The audible signals comprise the tone signals that typically come from a central office, such as "dial tone", "ringing", and "ring-back" signals. Alerts by means of other tones, pre-recorded speech, or synthesized speech are also possible, of course.

Data interface block 80 assembles the data provided by element 60 and control signals provided by controller 300 (via path 302) into ATM cells and, conversely, dissembles decrypted ATM cells and develops control signals for controller 300 (path 301) and data signals for element 40. The structure of data interface block 80 can follow the teachings of U.S. Pat. No. 5,136,584, issued to Hedlung on Aug. 4, 1992.

Channel interface element 90 is also a two-wire to four-wire converter whenever the channel at port 200 is a "two-wire" system. Primarily, however, element 90 forms the interface to the transmission medium and the network connected thereto. The transmission medium can be any one of a variety of types. It can be a wire pair, optical fiber, coax cable (of the type used by cable TV companies), power lines, wireless, etc., and the signal characteristics might be different for the different types of interfaces. (The wireless connection can be to a point outside the home or, for example, to a unit that couples element 90 to a television cable inside the home.) Accordingly, element 90 is designed for the particular type of transmission medium that the customer has. For all of the above-mentioned types, however, the digital data is typically converted to analog form and band-limited to a particular frequency band (perhaps requiring frequency shifting). This is basically modem technology, and one such approach is described, for example, in "51,84 b/s 16-CAP ATM LAN Standard", *IEEE Journal on Selected Areas in Communications,* Vol. 13, No. 4, May, 1995, pp. 620–632, authored by G. H. Im, D. D. Harmon, G. Huang, A. V. Mandzik, N. -H. Nguyen, and J. -J. Werner. For optical fiber interfaces, element 90 includes electrical/optical conversion means, and for wireless interfaces, element 90 includes wireless transmission and reception means. These are perfectly conventional.

Controller 300 is, conveniently, a microprocessor which controls all of the other elements in the FIG. 2 arrangement. Exactly what it does is dependent on the manner by which the FIG. 2 arrangement provides the POTS service, and the other features that are provided to the customer. Storage element 320 maintains the programs and data that controller 300 needs.

The remaining element depicted in FIG. 2 is ID block 310. Block 310 stores a unique identifier for each and every constructed piece of equipment that embodies the FIG. 2 arrangement. It uniquely identifies the hardware. As depicted in FIG. 2, it is coupled to controller 300, and through controller 300 a signal that corresponds to the identifier is sent to port 200 (and may also be sent to element 10 and port 100, if the need arises). Element 310 can be a ROM chip, burned-in logic values in a register, or the like. Element 310 can also be part of the controller. The ID identifier signal may be sent to port 200 following the initial coupling of the FIG. 2 apparatus to the network, to register with the network the fact that the equipment is now part of the network, and at other times, such as described below. As an aside, another unique identifier can be part of the telephone apparatus that is connected to port 100 and, similarly, a unique identifier can be part of all equipment that makes up the network to which port 200 is coupled.

While the above indicates that the identifier of block 310 is unique, it should be understood that the uniqueness need not be more extensive than is necessary for a unique identification of the hardware when it is connected to the telecommunication network. Hence, if the network is subdivided into subsets, or subnetworks, then the ID must be unique vis-à-vis the other hardware in the particular network, subset, or subnetwork.

Figure 3:
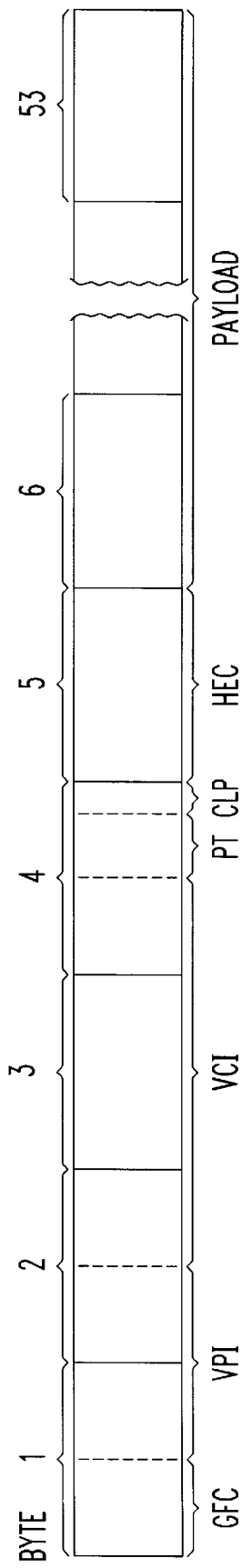
FIG. 3 describes the format of an ATM packet.

In order to better understand the operation of the FIG. 2 arrangement, and in particular the operation of block 80, it is useful to review the structure and "components" of the ATM packet, as depicted in FIG. 3.

The first four bits comprise a generic flow control. This field has local significance only and can be used to provide standardized location function on the customer's site.

The next byte provides the virtual path identifier (VPI) and the following two bytes correspond to the virtual channel identifier (VCI).

The next three bits correspond to the payload type (PT), which identify whether the packet contains user information or control information. It is also used to indicate a network congestion state, or for network resource management.

The last bit in the fourth byte is the CLP field, which allows the user or the network to optionally determine whether losing a cell is permitted under certain network traffic conditions.

The fifth byte is a header error check byte (HEC); and

The next 48 bytes are the packet payload.

Thus, through the PT field, ATM offers users the ability to identify packets as being data packets or control packets; and in the latter, the nature of the control is embedded in the 48 payload bytes.

The function of block 80 is to convert groups of bytes into ATM cells and, conversely, to convert ATM cells into groups of bytes. In the FIG. 2 embodiment, at least one piece of information is not encrypted in the ATM cells that are constructed in element 80 and applied to element 90, and that is the address field. An additional field which might not be encrypted is the PT field, which in the presented embodiment characterizes the cell as a cell that contains speech signal information, data, or control information. This field can be used as "speech flag" which may be used in the network to which port 200 is coupled to give priority to speech signals over data and control signals. Alternatively, the priority for the speech packets can be established when the virtual circuit is set up. In any event, an ATM cell is assembled by combining the address information (and perhaps the PT field value) with the encrypted data provided by element 60. When a received (decrypted) ATM cell is disassembled by element 80, the address field is discarded and the PT field value is used to determine whether the "payload" packets should be routed to controller 300 or to decoder 40.

Figure 4:
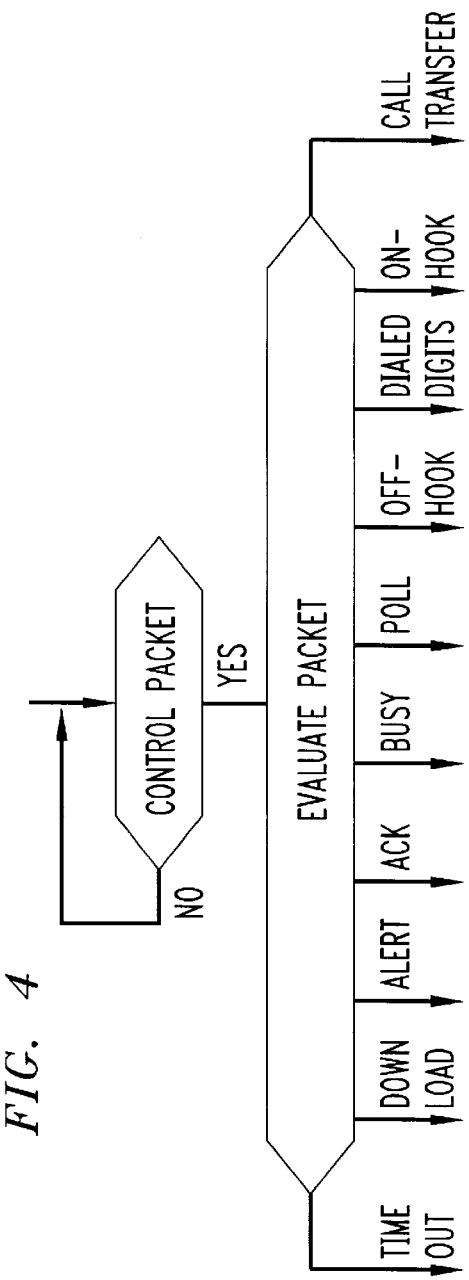
FIG. 4 suggests a control approach for controller 300.

FIG. 4 presents a basic flow chart depicting the operation of the FIG. 2 controller. When control information arrives, whether from an ATM cell arriving at port 100, or from element 10, controller 300 detects the arrival of the control information, identifies the nature of the control, and acts appropriately. The following describes the operation of the FIG. 2 hardware in response to some of the more common controls.

In operation, when the FIG. 2 apparatus is in a quiescent state, channel interface 90 can receive a signal, for example, that corresponds to a control cell. Element 90 recognizes (through the address field) that the cell is destined to the FIG. 2 apparatus and applies the cell to element 70. Element 70 decrypts the payload and applies the data to element 80. Element 80 recognizes that the cell is a control cell and directs the payload to controller 300. The control can, for example, be a call initiation cell, which identifies the calling party that wishes to connect to the FIG. 2 apparatus. Controller 300 knows that port 100 is not presently active with another conversation (when that is the case), and therefore it acknowledges the invitation to create a connection, by executing the following:

1. Derives the calling party's address (from the call initiation cell).
2. Using its own address and the derived calling party's address, sends a control cell back to the calling party indicating an acknowledgment. More specifically, controller 300 directs element 80 via line 302 to assemble a control cell that is sent back to the calling party, and informs element 80 of the control data that is to be transmitted via line 301 and multiplexer 31.
3. Through synthesizer 50, sends an alert (ringing) signal to port 100.

When the telephone that is connected to port 100 goes off hook, element 10 detects this condition and informs controller 300 that the customer went off hook. That condition indicates that voice communication can proceed; whereupon, controller 300 directs element 80 to assemble and send a control cell to the network and to the calling party to inform them that the call can proceed, and the ringing signal that is applied by synthesizer 50 to port 100 is turned off.

When the conversation is terminated by the telephone instrument at port 100, and element 10 detects the state change from "off hook" condition to "on hook" condition, a control cell is sent to the calling party, informing it (and the network) that the conversation was terminated, allowing the calling party to send a command to the network to release the virtual path that was assigned to the call by the ATM switches in the network.

When the condition is such that when the telephone connected at port 100 is in conversation with some other party when a call initiation cell arrives (and, of course, controller 300 is aware of this), controller 300 sends a "busy" control cell to the calling party.

When the telephone at port 100 wishes to place a call, it goes "off hook" and thereby informs controller 300 of its intention. Controller 300, in turn, directs synthesizer 50 to output signals that mimic the central office dial tone, which informs the customer at port 100 that the system is ready for dialing. Dialed digits that subsequently appear at port 100 are detected in element 10 and applied to controller 300. Controller 300, in turn, directs element 80 to assemble an ATM control cell that informs the network of its desire and provides the network with the number of the called party. The network decides on the path between the calling party and the called party, provides the network switches with the necessary information, adds the calling party's address to the call initiation cell, and forwards the cell to the called party. The called party, as described above, returns either an acknowledgment control cell, or a busy control cell.

In response to an acknowledgment cell, controller 300 directs synthesizer 50 to output a "ringback" signal to port 100. This "ringback" continues until a control cell arrives from the called party, indicating that the called party went "off hook". At such a time, the "ringback" signal is discontinued and the telephone enters the conversation mode. In response to a "busy" cell, controller 300 directs synthesizer 50 to output the "busy" signal to port 100.

The ID of the FIG. 2 apparatus is included in some, or perhaps all, of the cells that are sent out by the FIG. 2 apparatus. That can be used to advantage by the network. For example, the network can poll the FIG. 2 apparatus and request thereby that the apparatus identify itself. Alternatively, controller 300 can include a timer that, every so often, causes the controller to output a control cell to port 200 which informs the network of the identity of the FIG. 2 apparatus. That timer may be active all the time, or perhaps just during active conversations. The timer could also have different cycle times: a very long cycle time when the apparatus is inactive (e.g., every 4 hours) and a short cycle time when the apparatus is active (e.g., every second).

If the polling approach is used, the control cell that initiates the polling can also request that the apparatus divulge its status, both in the sense of information that specifies the state of the apparatus, and information that informs of the operational viability of the apparatus. Status information of the first kind (operational status) includes information such as "idle", "busy", "ringing", "637 port 100 has nothing connected to it", "the telephone at port 100 is off hook", "encryption is activated", etc. Status information of the second kind (viability status) includes information such as "the encoder is not working properly", "the unit is dead", "the decrypt circuit found 17 parity errors since the last check", etc. In FIG. 2, the status information that is collected by controller 300 is depicted by the group of arrows 311–313. Of course, a cell that reports to the network on the status of the FIG. 2 apparatus includes the ID signal.

The transmission of status information to the network is not limited to responses to polling queries. As with operational status where controller 300 takes action in response to changes (e.g., when the telephone instrument goes off hook), controller 300 can also take action in response to changes in the viability status information. This can take the form of a control cell that is sent to the network to inform the network of the problem, an accumulation of data in memory 320, the turning on of an alert indication at the FIG. 2 apparatus to provide a visual alert to the user, or even sending an alert signal to port 100.

The unique ID can also be used in the context of the network. That is, the ID can be the mechanism for tying a user to the use of the network and to the charges that are billed the user. This function is currently handled by the phone number that is assigned to the user, but in most situations the phone number really identifies the network port to which the user is connected. By using the ID, the user's apparatus can move from location to location, and once the apparatus is connected to the network and registered (e.g., through the above-disclosed polling process), the network can always associate the phone number assigned to the user with the ID of the user's apparatus and with the network port to which the apparatus is connected.

It should be reiterated, perhaps, that the embodiments disclosed above are merely illustrative, and they can be easily extended to cover different capabilities and embodiments that, nevertheless, remain within the scope of this invention.

For example, as indicated above, it is quite conceivable that the telephone instrument coupled to port 100 and element 10 can merge. It is also quite conceivable that all digital processing—which may include all of the FIG. 2 elements except portions of elements 10 and 90—can be implemented in one, or a few, stored program processors (see discussion below relative to FIG. 7).

Figure 5:
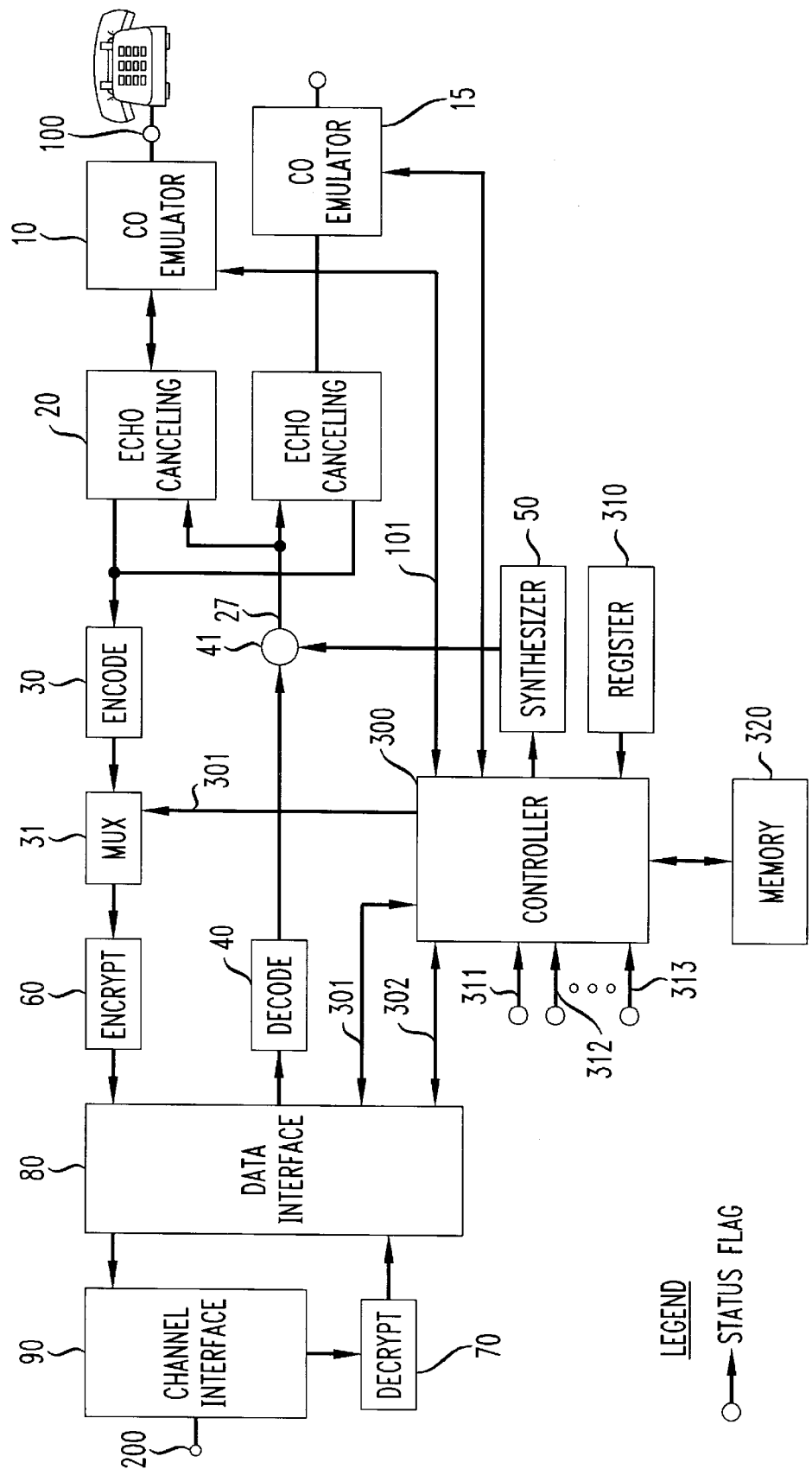
FIGS. 5–6 depict modified block diagrams of apparatus that interact with a telecommunication network in packet format.

Also for example, there is no reason to limit element 10 to a single port. It is a straight forward extension to include two or more ports out of element 10 to create two independent channels of communication. This is shown in FIG. 5. This simple extension offers customers two independent network appearances. Each appearance can correspond to a different number, or they both can be known to the network by the same number. The network would simply carry two conversations with the two appearances, with each conversation being identified by an appropriate "conversation flag". The network would know, for example, that telephone number 582-3001 is a network interface unit sitting at a network address 333.432 and coupled to port 1 of a network interface unit having the ID AS234094, while telephone number 582-5432 is coupled to port 2 of the same network interface unit.

Figure 6:
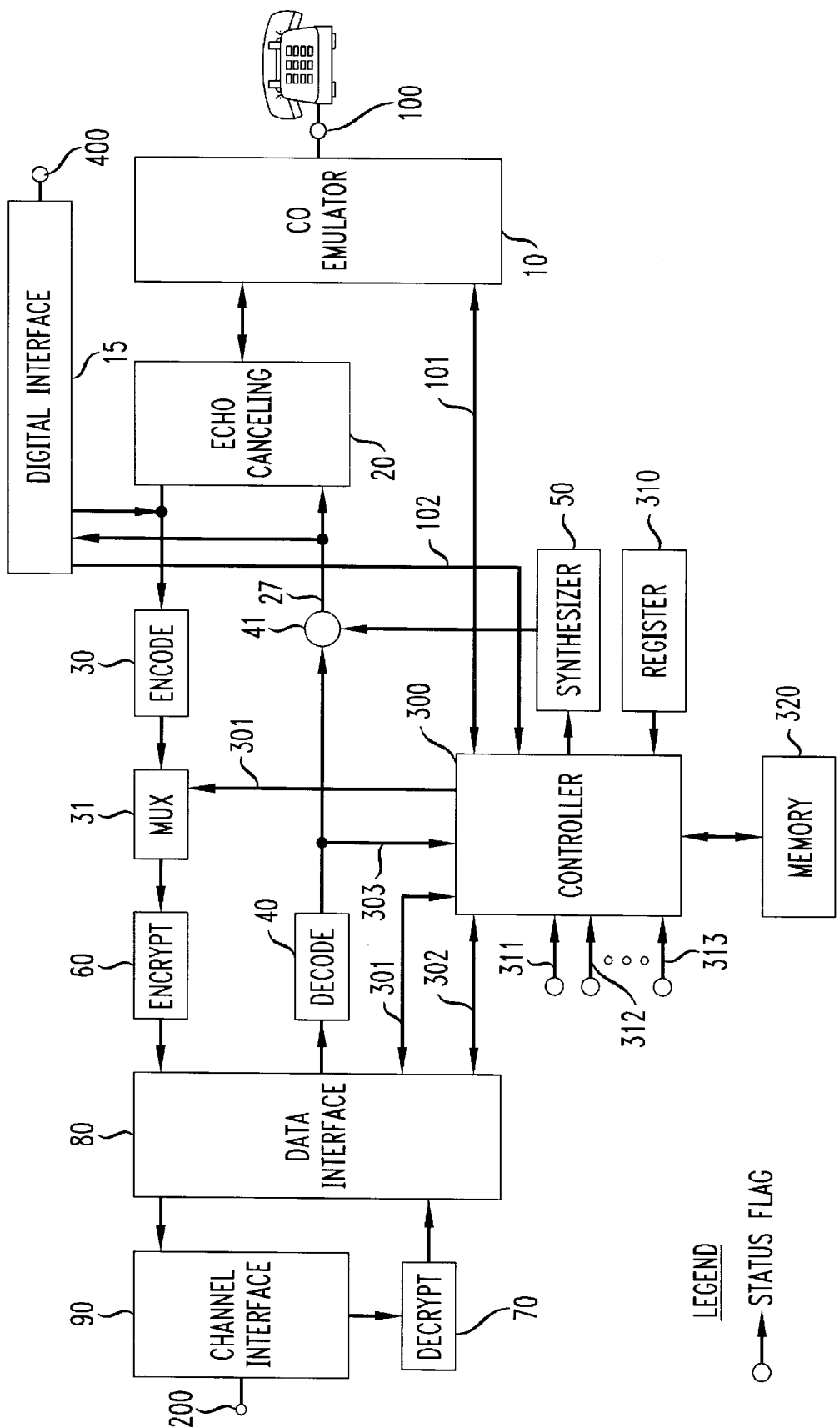

A digital appearance can also be had, for example, for a digital fax machine or another data instrument, and that instrument would be coupled to encoder 30 and adder 41 through a digital interface circuit 15, as shown illustratively in FIG. 6. Element 10 of FIG. 6 and element 15 are adapted, of course, to deal with the conditions that exist when more than one call flows through element 90 and port 200. In particular, when two independent calls are being carried, ATM cells arriving at port 200 will have designations hat will distinguish the two calls (e.g., different source addresses, or different virtual circuit labels). Controller 300 is responsive to those designations, and routes the corresponding packets that are developed by decoder 40 either to port 100 or to port 400. This is accomplished by control lines 101 and 102. Correspondingly, information arriving from elements 10 and 15 is accepted by encoder 30 (the bytes being appropriately staggered by controller 300 to avoid collision) and controller 300 keeps track of those bytes, and routes them to separate ATM cells that are assembled in element 80.

Figure 7:
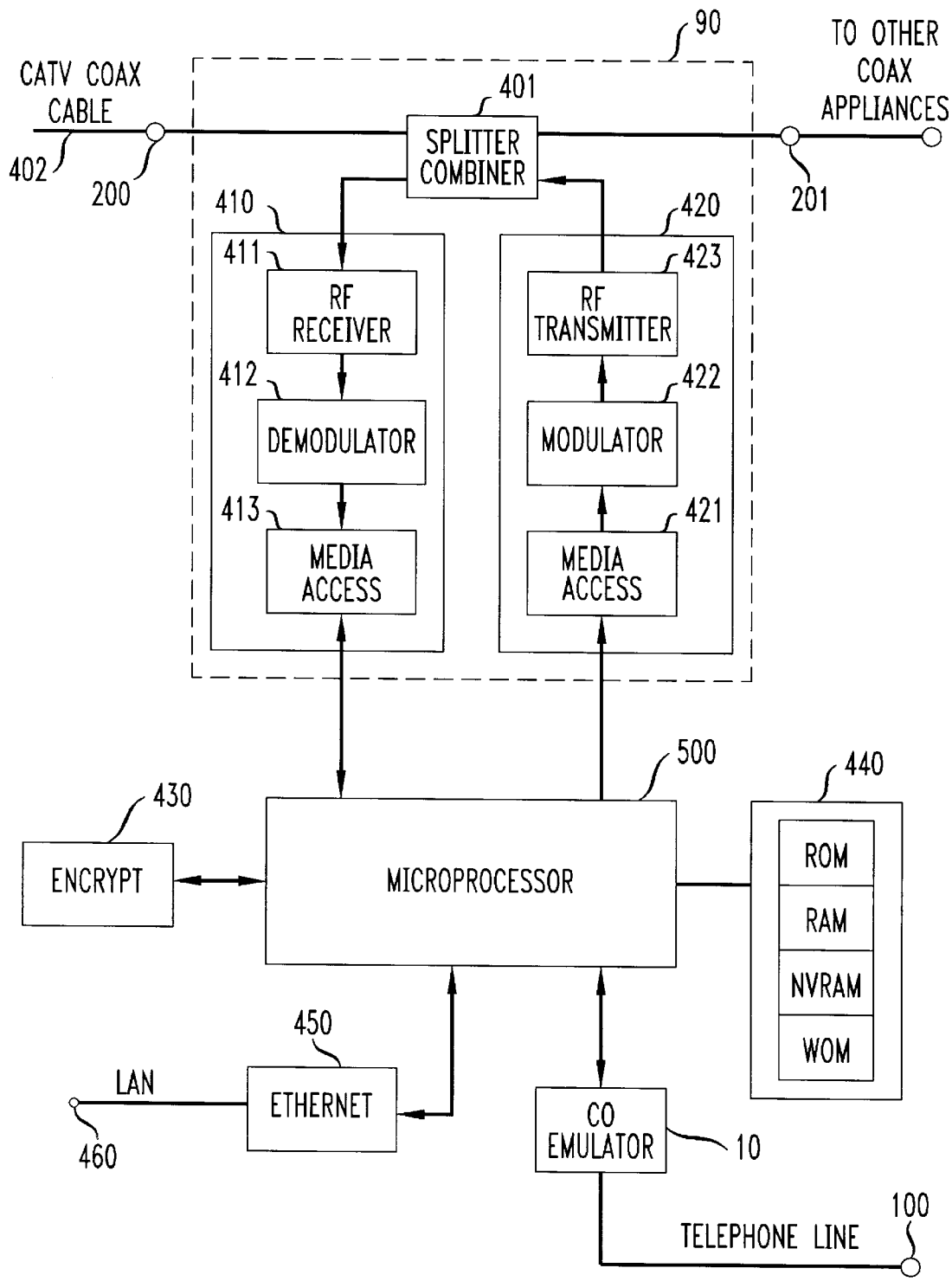
FIG. 7 illustrates an embodiment that is microprocessor-centered.

The embodiments disclosed above are illustrated with distinct elements for the different functions that are implemented. This is, in part, in order to clearly teach the invention. Other, more compact, embodiments are possible and, indeed, are likely in view of the trend to implement systems with microprocessors under control of stored programs. FIG. 7 presents such an embodiment, where microprocessor 500 is at the heart of the apparatus.

More specifically, FIG. 7 depicts an embodiment where a coaxial cable 402 is the transmission medium that couples the telecommunication network to port 200. Channel interface unit 90 is made up of a combiner/splitter 401, a receiver module 410, and a transmitter module 420. The combiner/splitter may be a simple transformer.

Microprocessor 500 is connected to modules 410 and 420. Microprocessor 500 supplies module 420 with parameters that the module needs for headers of ATM packets, and it also supplies the data, or "payload", of the ATM packets. Within module 420, media access unit 421 creates ATM packets from the information supplied by processor 500. Those packets are then applied to modulator 422. Modulator 422 converts the bytes supplied by processor 500 to symbols, and modulates a carrier with those symbols in accordance with a selected modem approach. In some modulation approaches, the output of modulator 422 is a baseband analog signal, i.e., occupying a frequency band from 0 to some selected upper frequency. In such situations, RF transmitter unit 423 which couples modulator 422 to combiner/splitter 401 includes an amplifier and a modulator that shifts the band of the signal developed by modulator 422 to the band specified for coax cable 402. In the alternative, modulator 422 creates a signal that already is in the proper band, and in such situations transmitter unit 423 needs to only perform the amplification.

In the reverse direction, the signal arriving at receiver module 410 is an analog signal that carries a large number of information channels; e.g. a number of TV channels. Among them is the information channel that is aimed at the FIG. 7 apparatus. Accordingly, receiver module 410 includes an RF receiver unit 411 that is tuned to receive the correct channel of information and, if necessary (for the workings of the demodulator that follows), demodulates the information down to "base band". The output of unit 411 is applied to demodulator 412 which outputs the ATM packets. Those packets are applied to media access unit 413 which reads the stream of bits, interprets it as ATM packets, and when it identifies a packet with a header address that corresponds to the address of the FIG. 7 apparatus, it provides the contents of that ATM packet to processor 500.

The "apparatus address", by the way, can be the ID of the apparatus, described above, or it can be some other preset identifier, such as a "phone number". The particular data that is used as an "apparatus address" depends, of course, on the network to which the FIG. 7 apparatus is connected. In any event, the "apparatus address" can be loaded by microprocessor 500 into a field programmable ROM within unit 420.

The encryption and decryption of data signals which, for example, is effected in the FIG. 2 apparatus with elements 60 and 70 are shown in FIG. 7 with a separate processing unit (430) that is coupled to microprocessor 500. It is depicted as a separate unit because with current microprocessor capabilities the encryption and decryption function is too demanding to be accommodated in the same microprocessor that performs the other functions. Of course, it is quite possible that future microprocessors will be able to handle the load.

Control of microprocessor 500 is effected through stored programs that reside in memory module 440 that is coupled to microprocessor 500. Memory module 440 is shown to include a ROM portion, a RAM portion, an NVRAM (non-volatile RAM), and a Write Once Memory (WOM) portion. The ROM holds the permanent, basic programs; the RAM holds transitory values that processor 500 determines, or evaluates; and the NVRAM holds the various static parameters and programs that are downloaded to the apparatus through port 200. The Write Once Memory may be a fused link type of memory, and it stores the apparatus ID.

Microprocessor 500 is also connected to CO emulator block 10, described above, and block 10 is coupled to port 100. Also, microprocessor 500 is connected to ethernet circuit 450 which provides an interface between microprocessor 500 and ethernet port 460 to which digital equipment can be coupled. This block corresponds to block 15 in FIG. 6.

Thus, microprocessor 500 of FIG. 7 corresponds to controller 300 and all of the other elements shown in FIG. 6, save for the channel interface, CO emulator, the digital interface, and the encrypt and decrypt circuitry.

One advantageous characteristic of the apparatus disclosed above is that many features that are now available to home telecommunication systems (e.g., telephone instruments, answering machines, and the like) can optionally be incorporated in the disclosed apparatus in addition to the basic POTS features described above. The following presents a number of examples:

Messaging

Currently, messaging is either a network-based or customer premises-based feature (in the form of a telephone answering system, or a PBX-based messaging system). In an arrangement of the type that employs the FIG. 2 apparatus, the same capability can be had. This capability can be digital or analog, it can be closely associated with controller 300, or it can be a separate conventional telephone answering machine that is connected to a second port of element 10. If that second port is an analog port, the apparatus has a structure that is not unlike the one presented in FIG. 5. When the telephone answering machine is digital (in the sense of having a digital interface), then the FIG. 6 apparatus is applicable. Lastly, when the telephone answering functionality is incorporated in processor 300, then decoder 40 information is fed to processor 300, via line 303, and memory 320 serves as the digital store of incoming messages. This is depicted in FIG. 8. The messaging system's outgoing message is also stored in memory 320 and it is provided to port 200 via line 301. It is stored in memory 320 by controller 300 processing a voice message from port 100 via the signal path from the CO emulator to the controller (e.g., line 101). In an alternate embodiment, an additional signal path 304 from encoder 30 to controller 300 can be included.

A messaging feature in an arrangement such as shown in FIG. 6 operates as follows. When a call initiation ATM cell comes into port 200 and is destined to port 100, controller 300 determines whether port 100 is occupied with a present conversation or not. When the messaging system is inactive and when port 100 is busy with another conversation, controller 300 normally sends out a cell that informs the calling party of the busy status (as has been described above). When port 100 is not busy, ringing signals are applied to port 100 by synthesizer 50.

When the messaging system is active, the system's operation is altered. Specifically, when port 100 is busy, controller 300 can determine (see "screening" below) whether to direct the call to the telephone answering port of element 15. When it does, the telephone answering unit is alerted (e.g., by synthesizer 50), is activated, and is caused to record the incoming message. When port 100 is not busy but it is determined that synthesizer 50 has sent a sufficient number of rings to port 100 and port 100 has not gone "off hook", controller 300 redirects the alert signal of synthesizer 50 to element 15, and element 15 reacts as described above.

Call Transfer/Forwarding/Bridging

Call transfer, call forwarding, and call bridging are closely related. They basically address the issue of informing the network of what to do with a present call (call transfer and call bridging) or with a future call (call forwarding).

With respect to transfer of present calls, a control signal from the instrument at port 100 informs controller 300 that a call transfer (for example) is desired. In response, controller 300 directs element 80 to assemble and send out a control ATM cell that informs the network to modify the destination address of the call. Once the network gets the information, it changes the routing of cells to accommodate the transfer request.

For bridging, controller 300 can simply accept cells from different sources and apply the information to port 100, can replicate its speech data and send out a number of cells, each directed to a different destination.

With respect to future calls, i.e., call forwarding, controller 300 accepts incoming call initiation cells and, based on data stored by the user in controller memory 320 which specifies some remote destination, controller 300 directs element 80 to create and send out a control cell that directs the network to transfer the call to the specified remote destination. In effect, it is treated as a call transfer process. Of course, it is quite easy to make such call transfers selective, based on the calling party's ID.

Repertory Dialing

Repertory dialing is merely a mechanism for accessing a pre-stored dialing string. Memory 320 and controller 300 can easily provide the necessary functionality. Controller 300 can be made sensitive to a pre-designated dialing sequence that is reserved for repertory dialing (e.g., a sequence of two digits that starts with "#") and in response thereto the controller accesses the appropriate dialing string in memory 320.

Caller ID

Caller ID requires a means for informing the user who the calling party is. In accordance with the present disclosure, controller 300 has the destination information of the calling party even before the user goes "off hook". Therefore, the task of providing a caller ID reduces to the task of merely providing a translation from the source address of the calling party to something that is recognized by the customer.

Such translation is achieved for customers who subscribe to the caller ID feature by allowing the FIG. 2 apparatus to access a network "Caller ID" node (which can be a simple data base that is coupled to the network through a unit that has the FIG. 2 design). When a call initiation cell arrives at port 200, controller 300 effectively establishes a call to the "Caller ID" node and obtains from that node information about the identity of the calling party. All this is done before a ringing signal is applied to adder 41 by synthesizer 50. Thereafter, the ringing signal is applied by synthesizer 50, and controller 300 provides the caller ID information to the display in the telephone that is connected to port 100 (or to a display on the FIG. 2 apparatus itself).

Given the processing and storage capability of the FIG. 2 apparatus, the received correlation of calling party information to the caller ID can be stored in memory 320. Thereafter, translations from the same calling party can be done locally. This would allow a quicker translation, less burden on the network, and even a customization of the alert messages (e.g., "your brother Harry is calling"). An interesting alternative to the telephone display is to tailor the ringing signal to the identity of the calling party. This can take the form of distinctive ringing for a class of callers, or it can even be a synthesis of the caller's name (e.g., "Harry Newman is calling").

Call Waiting

Call waiting is an arrangement where a party that is busy with one conversation is informed that another calling party wishes to be connected. The user can alternate between the two phone calls.

This capability can be easily achieved in the FIG. 2 apparatus because it is simply a situation where controller 300 either sends cells to, and accepts cells from, one destination, or another destination. Controller 300, in turn, may be responsive to a switch hook flash, or to some other signaling means.

Screening

Again, given that controller 300 includes memory, it is possible to store calling party numbers and designate various call treatments to those parties. This may include sending calls from selected parties directly to the messaging system, ignoring calls from selected calling parties, etc.

Time-out

There is probably not a person in the U.S. who has not been called during dinner, or some other inconvenient time. Many of those might appreciate a feature where the telephone ignores all calls (or all calls from other than a selected set of calling parties) for a selected period of time. Such a feature can be easily accommodated in controller 300 by combining a timer with the screening feature.

Downloading

The above-described features and capabilities of the disclosed apparatus are service features that are presented for illustrative purposes. Other, or additional, service features can be easily embodied as well. Moreover, it should be understood that whatever set of features is included in a particular built apparatus, the set of features need not remain static. That is, features can be removed or added even after the apparatus is built, sold to a user, and installed. Indeed, features can be added to the apparatus through the connection to the network.

Stated in other words, one of the features that may be included in the disclosed apparatus is a downloading feature. This feature places a call to a designated number and downloads data into memory 320 (e.g., in FIG. 6, or the NVRAM portion of memory 440 in FIG. 7). The manner by which microprocessor 300 interacts with the designated number and downloads the data is quite simple, since the only difference between downloading a program and receiving data that is sent to port 400 (in FIG. 6) is that the destination of the data is changed; that is, the signal is captured by processor 300 via line 303. The concept of downloading features and capabilities is disclosed in U.S. patent application Ser. No. 08/341,805, now abandoned filed for B. Waring Partridge on Nov. 18, 1994. Alternatively, of course, a CDROM or floppy disk reader can be coupled to controller 300 (employing well-known approaches for coupling a reader to a computer) and features can be installed through such a reader.

The above descriptions of the network interface units have concentrated on embodiments for a customer-premises unit. It should be realized, however, that the FIG. 5 and FIG. 6 arrangements, slightly modified, are extendible to network interface units that couple the packet-switched network to elements other than customer-premises telephones, answering machines and the like. The network interface unit can couple the packet-switched network to a PBX, to a central office, and even to a whole other, circuit-switched, network. The differences between the FIG. 5 arrangement, for example, and a network interface unit for a central office lie in a) the number of ports 100 that are provided, and b) the nature of the controls that flow between the central office and the network interface unit.

For example, a network interface unit for a central office may include a digital interface 15 for signaling the central office, and a plurality of echo canceling blocks 20; but it would not have the co-emulator blocks or the synthesizer block. This is shown in FIG. 9.

There is, of course, also an issue of bandwidth, but that is a mere engineering issue. That is, beyond a certain number of analog trunks to the central office, elements 30, 60, 70, and 40 will not be able to handle the computation load. That is solved either with higher clock rates, or with a number of the network interface units being effectively combined into one.

I claim:

1. An apparatus including a first port adapted for communicating with a user, and a second port for coupling the apparatus to a telecommunication network comprising:
   a packetizer
      (a) for converting information signals from the first port, arriving at a first format, to packet signals, where a packet includes a header portion and an information portion and where the header portion comprises bits that are devoted to address specification, and at least one bit devoted to specifying whether the packets' information portion carries control or information signals, and
      (b) for converting packet signals arriving from the second port into signals having said first format; and
   a controller
      (a) for enabling concurrent two-directional flow of signals through said packetizer, to and from said first port,
      (b) for identifying signals incoming from said first port that represent control signals and converting them to packets with said at least one bit specifying that the packets carry control information signals; and
      (c) for providing telecommunication functions to said first port in response to certain control signals received from said first port, without forwarding corresponding signals to said second port.

2. The apparatus of claim 1 wherein the first port provides a POTS interface.

3. The apparatus of claim 1 wherein the packetizer includes circuitry for delivering sound to the first port and for converting sound received from the first port to electrical signals.

4. The apparatus of claim 1 where the packets are not more than 140 bytes long.

5. The apparatus of claim 1 where the packets are ATM packets.

6. The apparatus of claim 1 further comprising:
   an echo canceler having an analog signal node and two digital signal nodes, where the analog node is coupled to the first port and the two digital signal nodes are coupled to the packetization means.

7. The apparatus of claim 6 further comprising an interface circuit interposed between the packetizer and the second port, where signals between the interface circuit and the packetizer are said packets.

8. The apparatus of claim 7 wherein said interface means interfaces with the second port in the analog domain.

9. The apparatus of claim 7 wherein the interface means modulates digital signals onto an analog carrier signal.

10. The apparatus of claim 9 wherein the interface means includes wireless transmission means.

11. The apparatus of claim 7 wherein the interface means includes means for coupling signals flowing through the second port to a coax cable.

12. The apparatus of claim 7 wherein the interface means includes means for coupling signals flowing through the second port to a optical fiber cable.

13. The apparatus of claim 7 wherein the interface means includes means for coupling signals flowing through the second port to a 60 Hz power line.

14. The apparatus of claim 1 further including a speech processing module interposed between the first port and the packetizer, where the speech processing module comprises:

silence detection means responsive to speech signals arriving from the first port, for detecting silence in the speech signal, means for digitizing the speech signals to develop data signals, and an encoder responsive to the means for digitizing and to the silence detection means, to reduce bandwidth of the data signals.

15. The apparatus of claim 14 where the packetization means includes an encryption circuit responsive to output signals of the encoder.

16. The apparatus of claim 14 where the packetizer includes a decoder responsive to signals applied by the second port, for developing a decoded speech signal.

17. The apparatus of claim 16 wherein said decoder is responsive to information that indicates silence periods in said decoded speech signals.

18. The apparatus of claim 14 further comprising means, coupled to the controller, for detecting failure conditions of elements within the apparatus.

19. The apparatus of claim 1 further comprising means, responsive to the controller, for generating audio signals, and means for applying the audio signals to the first port.

20. The apparatus of claim 19 further comprising means, coupled to said controller, for detecting signaling conditions at the first port.

21. The apparatus of claim 20 wherein the signaling conditions includes "off hook" and "on hook" signaling.

22. The apparatus of claim 20 wherein the signaling conditions includes DTMF signaling.

23. The apparatus of claim 1 further comprising means for injecting signals from the controller into the packetizer, which signals are destined to the second port.

24. The apparatus of claim 23 wherein said means for injecting supplies signals to inform a telecommunication network coupled to the second port that the information signals from the first port are voice communication signals as compared to data signals.

25. The apparatus of claim 24 wherein the means for injecting provides a control packet that informs the network that the information signals from the first port are voice communication signals.

26. The apparatus of claim 24 wherein the means for injecting provides a control packet that informs the network that the information signals from the first port are voice communication signals as part of control packets that the means for injecting sends the network to set up a call from said analog instrument to a called party connected to the network.

27. The apparatus of claim 23 further comprising a third port, for communicating digital data therethrough; and means for routing information to the second port either from the first port or from the third port; wherein the means for injecting signals to the second port informs the network that the information signals from the first port are voice communication signals and that the information signals from the third port are non-voice communication signals.

* * * * *